Figure 1:
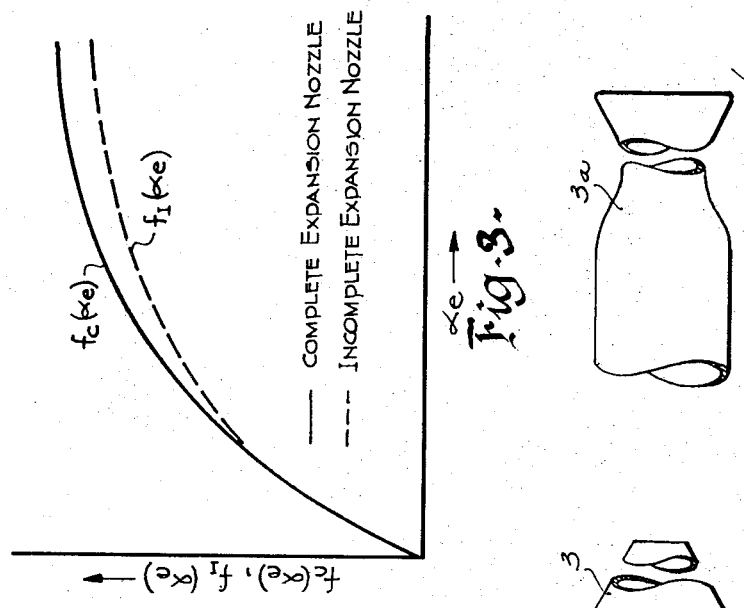

United States Patent [19]
McDonald

[11] 3,834,222
[45] Sept. 10, 1974

[54] METHODS AND APPARATUS FOR DETERMINING THE THRUST OF A JET ENGINE

[75] Inventor: George B. McDonald, Bells Corner, Ontario, Canada

[73] Assignee: Control Data Canada, Ltd., Willowdale, Ontario, Canada

[22] Filed: Feb. 27, 1973

[21] Appl. No.: 336,165

Related U.S. Application Data

[62] Division of Ser. No. 222,225, Jan. 31, 1972.

[52] U.S. Cl. ............................................. 73/117.4
[51] Int. Cl. ........................................ G01m 15/00
[58] Field of Search ........ 73/117.4, 116; 235/150.2, 235/150.22

[56] References Cited
UNITED STATES PATENTS
3,233,451  2/1966  Russ..................................... 73/116

OTHER PUBLICATIONS
Herrington, R. M. et al., Flight Test Engineering Handbook, Report No. 6273, May 1951, U.S. Air Force, Chapter 3, page 47.
Sivo, J. N. et al., A Method of Measuring Jet Thrust of Turbo Jet Engines in Flight Installations, NACA Research Memorandum, E53J15, Jan. 21, 1954, page 6.
Hesse, W. J., A Simple Gross Thrustmeter and some of its Applications at the Naval Air Test Center (Patuxent River, Maryland), Technical Report No. 1–54, March 24, 1954, pp. 30, 31, 62.

Antl, R. J. et al., Steady State Airflow and Afterburning Performance Characteristics of Four J85–GE–13 Turbo Jet Engines, NASA Technical Memorandum X–1742, Oct. 28, 1968, page 18.
Woodfield, A. A. et al., Measurements of the Performance of a Turbo Jet Engine with reheat in High Speed Flight and Under Simulated Conditions in Test Beds, Aeronautical Research Council Reports Memo, No. 3538, February, 1966, page 30.
Beaulieu, W. et al., Measurement of XB–70 Propulsion Performance Incorporating the Gas Generator Method, Journal of Aircraft, Vol. 6, No. 4, July 1969, pages 312–317.

Primary Examiner—Jerry W. Myracle
Attorney, Agent, or Firm—Walter C. Farley

[57] ABSTRACT

Apparatus is known for determining gross thrust in jet engines by measuring various internal pressures, including measurement of total pressure at the nozzle entrance by means of an immersed probe. The immersed probe has a very short life when an afterburner is used in the engine. The apparatus for the invention is able to determine total pressure at the nozzle entrance, without an immersed probe, from the total pressure in the diffuser and the static pressure at the nozzle entrance. Another embodiment makes use of an additional static pressure in the flame-holder region. Also, the invention is for determining the gross thrust of an engine and it distinguishes between an engine with a nozzle operating in a choked condition and an unchoked condition.

12 Claims, 5 Drawing Figures

3,834,222

METHODS AND APPARATUS FOR DETERMINING THE THRUST OF A JET ENGINE

This is a division of application Ser. No. 222,225 filed Jan. 31, 1972.

This invention relates to thrustmeters and to measurement methods for the determination of jet engine aerodynamic gross (jet) thrust.

The aerodynamic gross thrust of a jet engine is defined as the momentum of the nozzle exhaust gases plus any pressure force which exists due to incomplete expansion of the exhaust gases. This definition, written in equation from is:

$$F_G = m\ V_e/go + A_3\ (P_{se} - P_{so}) \quad (1)$$

wherein:
- $F_G$ = aerodynamic gross (jet) thrust
- $m$ = mass flow rate through the nozzle
- $V_e$ = velocity of exhaust gases
- $go$ = dimensional constant
- $A_e$ = exit area of nozzle
- $P_{se}$ = static pressure existing at the plane of the nozzle exit, and
- $P_{so}$ = ambient static pressure.

The previous teachings have developed various functional forms of this fundamental definition equation. It is well known from these teachings that a knowledge of the ambient static pressure and internal pressures in the exhaust region of the jet engine, in addition to a nozzle area, can enable a determination of the gross thrust.

In the previous teachings the following ratios of pressure are significant:
- $\alpha_e = P_{TN}/P_{so}$ = total pressure in the nozzle/ambient static pressure, and
- $\alpha_N = P_{TN}/P_{SN}$ = total pressure in the nozzle/static pressure at the nozzle entrance.

Depending upon the type of nozzle attached to the engine the basic gross thrust equation can be rewritten in the following pressure-dependent functional forms:

a. complete expansion nozzle $(P_{se} = P_{so})$ $F_G = P_{so} \cdot g_c\ (\alpha_e) \cdot F(A_e)$     (2)

b. imcomplete expansion nozzle $(P_{se} > P_{so})$ $F_G = P_{so} \cdot g_I(\alpha_e) \cdot f(A_e)$     (3)

wherein:
- $F_G$ = gross thrust
- $P_{so}$ = ambient static pressure
- $f(A_e)$ = Function of the nozzle exit area
- $g_c(\alpha_e)$ = function of the pressure ratio $P_{TN}/P_{so}$ for a complete expansion nozzle, and
- $g_I(\alpha_e)$ = function of the pressure ratio $P_{TN}/P_{so}$ for an imcomplete expansion nozzle. For variable nozzle exit area engines there are three variables involved in the computation of gross thrust. These variables are the nozzle total pressure $P_{TN}$, the ambient static pressure $P_{so}$ and the nozzle exit area $A_e$.

The difficulties associated with the inflight measurement of the nozzle exit area are overcome in the teachings by trading the $A_e$ measurement for a measurement of the nozzle entrance static pressure $P_{SN}$. In this case, the gross thrust can be computed using the simple equations which follow:

a. complete expansion nozzle $F_G = A_n \cdot P_{so}\ \alpha_e \cdot f_c\ (\alpha_e) \cdot h(\alpha_N)$     (4)

b. incomplete expansion nozzle $F_G = A_n \cdot P_{so} \cdot \alpha_e \cdot f_I(\alpha_e) \cdot h(\alpha_N)$     (5)

wherein:
- $F_G$ = gross thrust
- $P_{so}$ = ambient static pressure
- $A_N$ = area of nozzle entrance
- $f_c(\alpha_e)$ = function of the pressure ratio $P_{TN}/P_{so}$ for a complete expansion nozzle
- $f_I(\alpha_e)$ = function of the pressure ratio $P_{TN}/P_{so}$ for an incomplete expansion nozzle, and
- $h(\alpha_S)$ = function of the pressure ratio $P_{TN}/P_{SN}$ which is independent of the type of nozzle employed on the engine.

It will be noted from the above equations that the gross thrust can be calculated from a knowledge of three variables, namely, the nozzle total pressure $P_{TN}$, the ambient static pressure $P_{so}$, and the nozzle entrance static pressure $P_{SN}$. In this approach the nozzle entrance area $A_N$ is a constant.

A serious limitation of a current gross thrust measurement technique is the assumption that the nozzle is capable of expanding the exhaust gases to the ambient static pressure which exists at the operational altitude of the aircraft. This is a good assumption for low speed sea level operation of an engine fitted with a convergent nozzle. On the other hand for high flight speeds at increased altitudes this assumption, using the same nozzle, will provide a drastic over-prediction of the jet engine gross thrust. It therefore becomes important to recognize when the nozzle of a jet engine is, in fact, operating so that the exhaust gas is expanded to ambient static pressure, and when the nozzle is not operating so that there is complete expansion. This was not recognized in the past.

A drawback of another gross thrust measuring system is the calibration which is necessary in order to accommodate a specific engine nozzle. In such a prior art system the well-known thermodynamic function $g_c(\alpha_e)$ (or $g_I(\alpha_e)$) is replaced by an empirical relationship which is derived from established engine performance data. Changing the type of nozzle will require a recalibration of the tailpipe-nozzle configuration in order to provide an accurate indication of gross thrust.

A major disadvantage of current gross thrustmeters relates to the measurement technique which enables a calculation of gross thrust for an engine which operates in the afterburning mode. The current systems require a knowledge of the tailpipe (or nozzle) total pressure. This has been obtained using an immersed probe. With the afterburner in operation, special total pressure probes are required because of the extremely hot gases that exist at the measurement station. Attempts have been made to cool the immersed probe by intermittent immersion or continuous cooling, but these have not been successful in an airborne system. An immersed probe will fail in a very short time when the afterburner is operating.

Accordingly, it is a feature of this invention to provide a gross thrustmeter which avoids the use of immersed pressure probes in the tailpipe and nozzle regions of the jet engine.

Another feature of this invention is to provide a gross thrustmeter which can accommodate with minimal, or no, prior calibration both the complete and incomplete expansion nozzles of the fixed or variable area type.

A further feature is to provide an accurate gross thrustmeter which is insensitive to measurement errors associated with the obtaining or representative (average) total and/or static pressures at a measurement station.

Briefly, the present invention in its broadest aspect is for apparatus for determining the total pressure at the nozzle entrance of a jet engine without using an immersed probe. The apparatus comprises a pressure responsive means for detecting the total pressure in the diffuser and providing a first signal representative of said total pressure, pressure responsive means for detecting the static pressure at the nozzle entrance and providing a second signal representative of said static pressure, and computer means for combining at least said first and second signals in a predetermined manner to provide a third signal representing total pressure at the nozzle entrance.

An embodiment of the invention is for apparatus for determining gross thrust in a jet type engine, including apparatus which determines the total pressure at the nozzle entrance, and further comprises means for combining signals representing the total pressure at the nozzle entrance, ambient static pressure, predetermined constants and conditions to select one of the two predetermined relationships and evaluate it to obtain an indication of gross thrust.

Figure 2:
Figure 3:
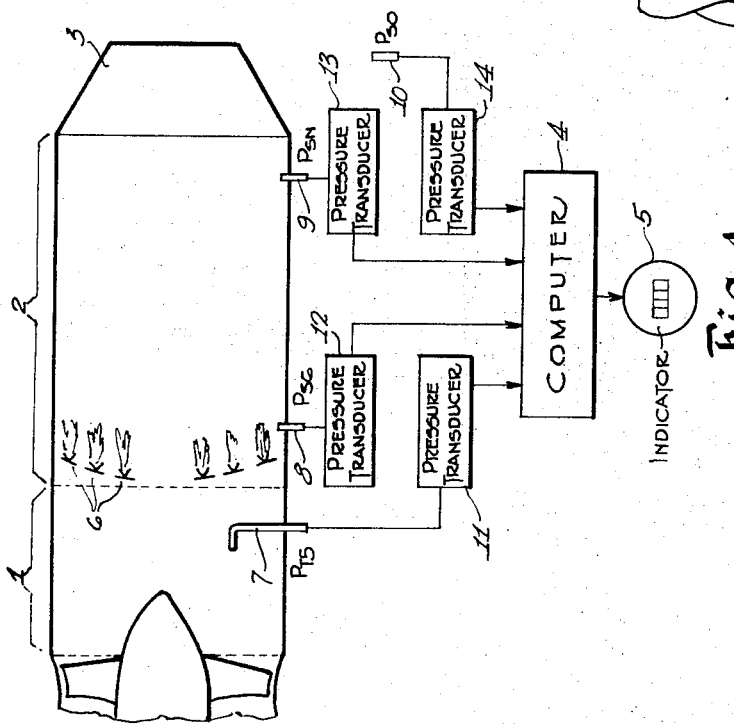
Figure 4:
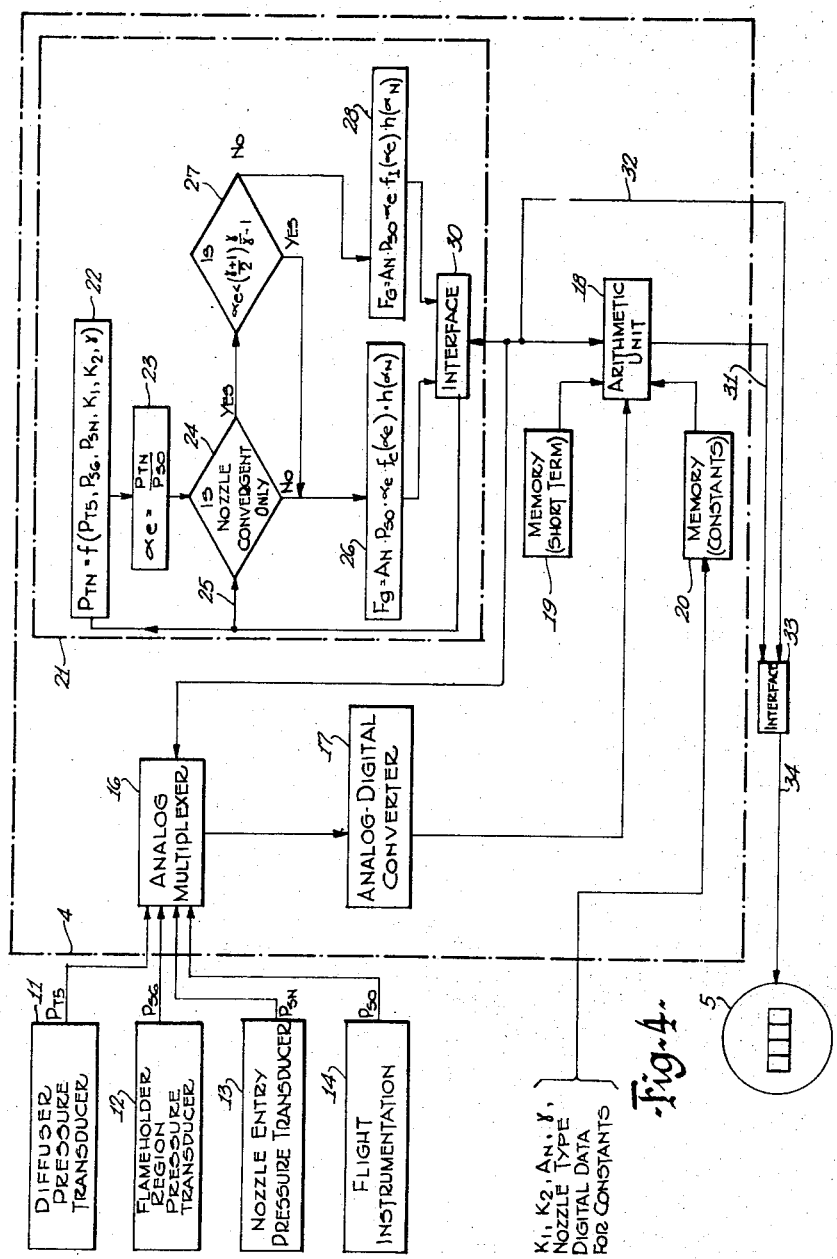
Figure 5:
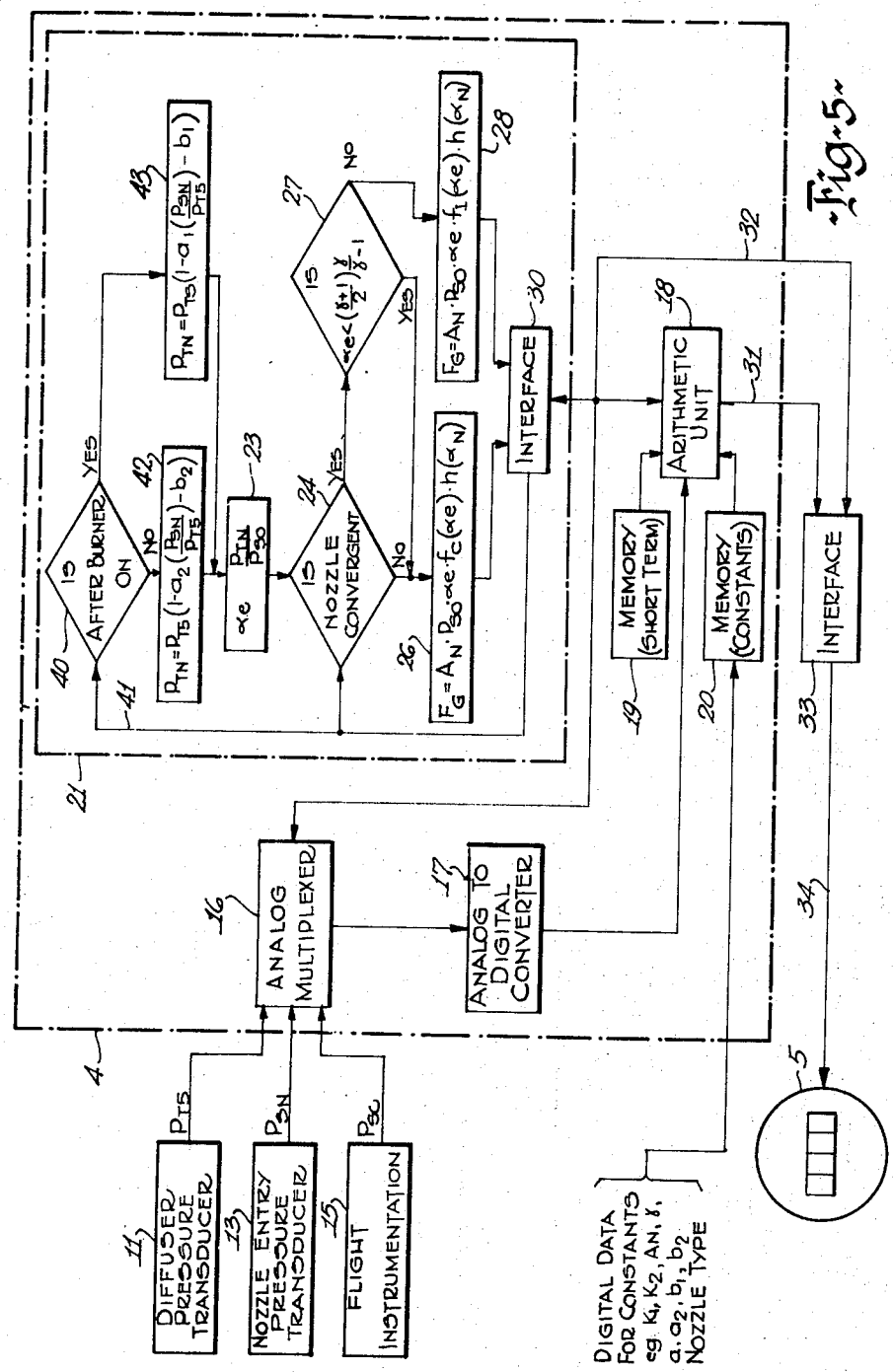

The invention will be described hereinafter in greater detail with reference to the accompanying drawings, in which FIG. 1 is a schematic diagram of the components of the invention, FIG. 2 shows diagrammatically basic types of nozzles which are fitted to jet engines, FIG. 3 is a graph showing the variation of the functions $f_i(\alpha_e)$ and $f_c(\alpha_e)$ with $\alpha_e = (P_{TN}/P_{so})$, FIG. 4 is a block diagram showing a gross thrust system, and FIG. 5 is a block diagram showing a modified gross thrust system.

Referring to FIG. 1 of the drawing, there is shown in schematic form, an afterburning jet engine with a diffuser 1, tailpipe (afterburner) 2 and nozzle 3. A computer 4 which receives signals from four pressure transducers 11, 12, 13 and 14 responsive, respectively, to total pressure ($P_{T5}$) from diffuser section at probe 7, static pressure ($P_{S6}$) from the flameholder area at tap 8, nozzle entry static pressure ($P_{SN}$) at tap 9, and altitude ambient static pressure ($P_{so}$) which is indicated as available at detector 10. It should be noted that the pressure responsive device at 8 for detecting $P_{S6}$ can be located at any convenient place between the upstream side of the diffuser and the nozzle entrance region where the device for detecting $P_{SN}$ is located at 9. In an engine with an afterburner, as shown, it is conveniently located in the afterburner region or flameholder region. In an engine without an afterburner it could be located in the diffuser. It should also be noted that for airborne installations a signal which is indicative of the altitude ambient static pressure is already available from the aircraft's flight instrumentation or control system. The computer 4 produces a resultant signal, which is indicative of gross thrust. This signal is fed to an indicating instrument 5 which displays the aerodynamic gross thrust $F_G$.

It will be apparent that two pressures may be detected and a signal representing the sum or difference applied to computer 4.

FIG. 2 shows examples of the two nozzle types referred to in the discussion of equations 10 and 11.

FIG. 3 is included to show generally, by way of example, the difference between two functions involved in determination of gross thrust for a complete expansion nozzle and an incomplete expansion nozzle as discussed in connection with Equations 10 and 11 and as previously referred to. It will be seen that as $\alpha_e$ or $P_{TN}/P_{so}$ increases the two functions $f_c(\alpha_e)$ and $f_i(\alpha_e)$ become further apart. The prior art did not recognize this and consequently there were inaccuracies in determination of gross thrust.

In the gross thrustmeter according to the invention it is not necessary to use a total pressure probe which is immersed in the gas stream in the tailpipe or nozzle regions. Thus, the jet engine can operate in the afterburning mode or not without affecting the determination of gross thrust. Internal engine pressures and the altitude ambient static pressure are the only dynamic parameters sensed in order to provide an indication of the jet engine gross thrust. Total pressures are sensed using conventional total pressure probes installed in the "low temperature" environment of the engine, i.e., upstream of the flameholder. Static pressures are available using static wall taps located in the entire tailpipe downstream of the flameholder. The exact location of the wall tap is not significant. The pressures need not be representative of the measurement station pressures since a simple static sea level calibration of the engine provides the means for correcting the measurements. The pressures may have to be corrected to account for radial pressure gradients which exist due to the three-dimensional character of the engine flow. A signal representing the altitude ambient static pressure is already available in the aircraft's flight instrumentation system. Thus, all the signals are readily available and serve as inputs to a computer which solves novel equations to determine gross thrust.

It will be recalled that it was previously indicated that the prior art did not recognize a difference between an engine operating so that there was complete expansion of the exhaust gases and so that there was incomplete expansion. It has been discovered that certain functions $f_i(\alpha_e)$ and $f_c(\alpha_e)$ appearing in equations used in determining gross thrust vary in a slightly different manner with $\alpha_e$. This is shown in FIG. 3 and will be referred to in more detail hereinafter.

In the present invention, a novel equation based on sound aero-thermodynamic principles, is employed to calculate the nozzle total pressure $P_{TN}$ using the diffuser total pressure $P_{T5}$ and at least two independent tailpipe static pressures. Depending upon the geometry of the nozzle as well as the sensed pressures, the computer selects one of the following equations to compute the gross thrust:

complete expansion nozzle: $F_G = A_N \cdot P_{so} \cdot \alpha_e \cdot f_c(\alpha_e) \cdot h(\alpha_N)$ incomplete expansion nozzle: $F_G = A_N \cdot P_{so} \cdot \alpha_e \cdot f_i(\alpha_e) \cdot h(\alpha_N)$.

Thus, the present invention involves implementation of the novel general theoretical relationship to determine the nozzle total pressure without actually measuring it. Furthermore, implementation of both gross thrust equations is carried out for selective use in determining jet engine aerodynamic gross (jet) thrust.

A convergent nozzle can expand engine exhaust gases to the altitude ambient static pressure whenever the Mach number at the nozzle exit plane is less than unity. This normally occurs at lower power settings at low altitudes and would be expected, for example, at take off. A variable exit area convergent-divergent nozzle can be constructed to essentially accomplish the complete expansion regardless of flight altitude and engine throttle setting. Thus, the static pressure at the nozzle exit plane $P_{se}$ will be greater than the ambient static pressure $P_{so}$ whenever a convergent nozzle commences operation at nozzle pressure ratios.

$P_{TN}/P_{so} > (\gamma + 1/2) \gamma/\gamma - 1$ (turbojet engine: single exhaust streams) wherein $P_{TN}$ = nozzle total pressure
$P_{so}$ = ambient static pressure, and
$\gamma$ = exhaust gas ratio of specific heats.

It is desirable to know the total pressure at the nozzle ($P_{TN}$) without using an immersed pressure probe. It will be recalled the exhaust gases are extremely hot at the nozzle when the engine is operating in the afterburning mode.

The following thermodynamically exact equation relates $P_{TN}$, $P_{T5}$ using two independent engine static pressures, predetermined functions of the pressures or differences thereof, known constants and predetermined functions of these constants:

$$P_{TN} = P_{SN} \cdot 1 + [(F_1(P_{S6}, P_{SN})/f_2(P_{S6}, P_{SN}) + f_6(\alpha_5) \cdot [f_3(K_2) + f_5(P_{S6}, P_{SN})/f_2(P_{S6}, P_{SN})] \cdot [f_7(\alpha_5) - K_1] / f_4(K_2) - f_5(P_{S6}, P_{SN})/f_2(P_{S6}, P_{SN}) \, K_3$$

wherein:

$K_1$ = dimensionless constant
$K_2$ = dimensionless constant derived from the tailpipe geometry
$K_3$ = dimensionless constant derived from the known thermodynamic properties of the engine exhaust gas
$P_{SN}$ = nozzle entry static pressure
$P_{S6}$ = static pressure near the flameholder
$\alpha_5 = P_{T5}/P_{S6}$ = total pressure upstream of the flameholder/static pressure near the flameholder
$F_6(\alpha_5), f_7(\alpha_5)$ = functions of the pressure ratio $P_{T5}/P_{S6}$ $f_1(P_{S6}, P_{SN}), f_2(P_{S6}, P_{SN}), f_5(P_{S6}, P_{SN})$ = functions of the tailpipe static pressures $P_{S6}$, $P_{SN}$, and
$f_3(K_2), f_4(K_2)$ = functions of the dimensionless constant $K_2$.

The constant $K_1$ is determined from performance data obtained from a non-afterburning static sea level test of the engine. When the engine operates in the afterburning mode the above equation, unmodified, can be employed to calculate the desired nozzle total pressure $P_{TN}$. Thus, the equation is useful in determining $P_{TN}$ in both afterburning and non-afterburning modes.

It will be obvious to someone with ordinary aerothermodynamic skill in the propulsion turbomachinery discipline that the method of enabling the obtaining of an indication of nozzle total pressure $P_{TN}$ does not depend upon any preferred location of the pressure probes (and taps). Consider, for example, a simple afterburning turbojet (compressor, combustion burner, turbine, diffuser, tailpipe and nozzle) engine. The conventional total pressure probe may be located anywhere in the diffuser section, i.e., downstream of the final turbine stage up to the tailpipe flameholder. The nozzle static pressure tap which indicates $P_{SN}$ must be located downstream of the flameholder. The static pressure $P_{S6}$ (defined as the flameholder static pressure) may be measured using a wall tap located downstream of the flameholder but upstream of the wall tap which measures $P_{SN}$. Either a wall tap or an immersed static pressure proble situated downstream of the final turbine stage, but upstream of the flameholder, will also provide the necessary indication representing $P_{S6}$.

It has been discovered to be possible to eliminate one independent static pressure measurement from the present gross thrustmeter system if the engine is tested, for calibration purposes, in both the dry (non-afterburning) and afterburning modes of operation. The present invention is therefore also concerned with the mechanization of the following simple technique which enables a calculation of the nozzle total pressure using two independent internal engine pressures and a few constants.

The relationship between $P_{T5} - P_{TN}/P_{T5}$ and $P_{SN}/P_{T5}$ is essentially a straight line for both the afterburning and non-afterburning modes of engine operation. The fact is displayed by the following simple equations:

a. afterburner on : $P_{TN} = P_{T5} \cdot (1 - a_1(P_{SN}/P_{T5}) - b_1)$ (8)

b. afterburner off: $P_{TN} = P_{T5} \cdot (1 - a_2(P_{SN}/P_{T5}) - b_2)$ (9)

wherein:

$P_{T5}$ = total pressure measured upstream of the flameholder
$P_{TN}$ = nozzle total pressure
$P_{SN}$ = static pressure measured downstream of the flameholder
$a_1$ = slope of the straight line representing an afterburning characteristic
$a_2$ = slope of the straight line representing a non-afterburning characteristic
$b_1$ = intercept of the afterburning curve on the axis used to represent $P_{T5} - P_{TN}/P_{T5}$, and
$b_2$ = intercept of the non-afterburning curve on the axis used to represent $P_{T5} - P_{TN}/P_{T5}$.

The nozzle total pressure $P_{TN}$ may therefore be calculated using the internal engine pressures $P_{T5}$ and $P_{SN}$ in one of the equations listed above. The equation selected is determined by the value of the ratio $P_{SN}/P_{T5}$.

In accordance with the present invention, the operation of the thrustmeter is based on the following considerations:

1. The nozzle total pressure $P_{TN}$ may be calculated using exact (7) or empirical (8 or 9) equations. Both equations are independent of the nozzle type fitted to the engine. The use of the exact equation necessitates the sensing of at least three independent internal engine pressures and requires an initial seal level static test of the engine running in the non-afterburning mode only. Employment of the empirical equations requires a measurement of at least two independent internal engine pressures. However, the engine must be initially static-tested at sea level over the entire range of throttle setting.

2. The aerodynamic gross thrust of a convergent-divergent nozzle may be computed using the complete expansion gross thrust equation:

$$F_G = A_N \cdot P_{so} \cdot \alpha_e \cdot f_c(\alpha_e) \cdot h(\alpha_N) \qquad (10)$$

wherein:
$F_G$ = gross thrust
$A_N$ = area of nozzle entrance
$P_{so}$ = ambient static pressure
$\alpha_e = P_{TN}/P_{so}$ = nozzle pressure ratio
$\alpha_N = P_{TN}/P_{SN}$ = nozzle total pressure/nozzle entry static pressure
$f_c(\alpha_e)$ = function of the nozzle pressure ratio $P_{TN}/P_{so}$ for a complete expansion nozzle, and
$h(\alpha_N)$ = function of the pressure ratio $P_{TN}/P_{SN}$ The ambient static pressure $P_{so}$ and nozzle entry static pressure $P_{SN}$ are measured; the nozzle total pressure $P_{TN}$ is calculated as per (1) above; the area of the nozzle entrance $A_N$ is known and the functions $f_c(\alpha_e)$ and $h(\alpha_n)$ are predetermined.

3. The areodynamic gross thrust of convergent nozzle may be computed using either the complete expansion gross thrust equation (Equation 10 above) or the incomplete expansion gross thrust equation which follows:

$$F_G = A_N \cdot P_{so} \cdot \alpha_e \cdot f_I(\alpha_e) \cdot h(\alpha_N) \qquad (11)$$

wherein
$F_G$, $A_N$, $P_{so}$, $\alpha_e$, $\alpha_N$ and $h(\alpha_N)$ are defined in (2) above and $f_I(\alpha_e)$ = predetermined function of the nozzle pressure ratio $P_{TN}/P_{so}$ for an incomplete expansion nozzle. The value of the engine nozzle pressure ratio $P_{TN}/P_{so}$ (see Equation 6) dictates which equation is employed to compute the gross thrust. If $P_{TN}/P_{so} = (\gamma+1/2) \beta/\gamma-1$ either the complete or incomplete expansion equations may be used. The complete expansion equation is necessarily employed whenever $P_{TN}/P_{so}$ becomes less than $(\gamma+1/2) \gamma/\gamma-1$ On the other hand, a choked convergent nozzle operation (i.e., incomplete expansion) is detected by values of $P_{TN}/P_{so}$ which are greater than $(\gamma+1/2) \gamma/\gamma-1$ and use is therefore made of the incomplete expansion equation.

Referring now to FIG. 4, there is shown in block form an example of circuitry suitable for a gross thrust meter according to this invention. Signals are provided from pressure transducers 11, 12, 13 and 14 and these signals represent, respectively, total pressure $P_{T5}$ from the diffuser, static pressure $P_{S6}$ from the flameholder area, static pressure $P_{SN}$ from the nozzle entry region, and ambient static pressure $P_{so}$. These signals are applied to a multiplexer 16 which provides as its output a series of signals variable in accordance with the signals applied to it. These signals are applied to an analog to digital converter 17 which converts the signals to digital form. The digital data is applied to an arithmetic unit 18. Associated with arithmetic unit 18 are three memory units. A short term memory 19 or "scratch pad memory," a constant memory 20 and a main program memory 21. The short term memory 19 scales the input data and stores it temporarily for use by the arithmetic unit 18 and as required by the program memory 21. The constants memory 20 receives, in digital form, signals representing constants involved in Equations 7 - 11, and also a representation that the nozzle is non-convergent (i.e., convergent-divergent) or is convergent only.

It will be recalled that there must be a determination of $P_{TN}$ or total pressure at the nozzle. The necessary values are present in memories 19 and 20 to solve equation 7. It is believed this is well within the ordinary skill of a workman in the computer arts. The block indicated as 22 in the program memory 21 solves equation 7 for $P_{TN}$ and is applied to circuitry represented by block 23 which provides a signal representing $\alpha_e$, i.e., representing $P_{TN}/P_{so}$.

As was previously explained it is necessary to ascertain (a) if the nozzle is convergent or convergent-divergent, and, depending on this, (b) if there is complete or incomplete expansion of exhaust gases. The decision circuitry receives over 25 a signal (originating in the constants memory 19) that the nozzle is or is not convergent. If the nozzle is not convergent (i.e., if it is convergent-divergent) the complete expansion equation (Equation 10) is selected as is indicated by block 26. If the nozzle is convergent a signal representing $\alpha_e$ is applied to decision circuitry represented by block 27 which determines whether there is complete or incomplete expansion. When $\alpha_e < (\gamma+1/2) \gamma/\gamma-1$ the expansion is considered as complete and Equation 10 is selected as in block 26, otherwise the incomplete expansion equation (Equation 11) is used as indicated by block 28.

The appropriate equation is available via an interface 30 and is solved by arithmetic unit 18 for gross thrust. The signal representing gross thrust is applied over conductor 31 to an indicator interface 33 which also receives a control signal on conductor 32. The indicator drive signal is applied to indicating instrument 5 over conductor 34.

It is believed that the computer circuitry for solving the equations set forth is within the ordinary skill of a computer technician and that no further description is required.

It was previously stated that when using the empirical Equations 8 and 9, only two indpendent internal engine pressures are required. This embodiment is shown in FIG. 5.

Referring to FIG. 5 it will be seen that the circuitry is quite similar to that of FIG. 4. In FIG. 5 there is no flameholder static pressure transducer, and the circuitry indicated within the main program memory 21 is altered. Thus, in FIG. 5 the two transducers 11 and 13 provide signals representing $P_{T5}$ and $P_{SN}$ while the flight instrumentation 15 provides a signal representing ambient static pressure $P_{so}$. These signals are multiplexed by multiplexer 16 and converted to digital form by analog to digital converter 17. The digital data from converter 17 is applied to arithmetic unit 18 as are the constants data from memory 20.

The program memory 21 contains a decision circuit 40 which receives over a connector indicated as 41 a data signal, which conveniently may be an input to memory 20, representing the afterburner operation. As was described in connection with Equations 8 and 9, the circuit 40 selects the equation represented by either block 42 or 43. The circuitry in the selected block provides as an output a signal representing $P_{TN}$ and this is applied to the circuitry represented by block 23 which determines $\alpha_e$. The remaining circuitry in program memory 21 operates in a manner similar to that described in connection with FIG. 4 and similar designation numbers are used. Similarly the manner in which the indicating device 5 is driven is the same in the FIG. 5 embodiment as in the FIG. 4 embodiment. It is believed that no further description is necessary for an understanding of FIG. 5.

It will be apparent that the invention described provides an improved thrustmeter of novel design which avoids the use of immersed probes and which can accommodate different nozzles and different operational modes with minimal calibration.

I claim:

1. Apparatus for use in combination with a jet type engine of a type having a diffuser and a nozzle, for determining the total pressure at the entrance to the nozzle, comprising pressure responsive means for detecting the total pressure in the diffuser and providing a first signal representative of said total pressure, pressure responsive means for detecting the static pressure at the nozzle entrance and providing a second signal representative of said static pressure, and computer means for combining said first and second signals in a predetermined manner to provide a third signal representing total pressure at the nozzle entrance.

2. Apparatus as defined in claim 1, in which said computer includes means for empirically determining constants by plotting $P'_{T5} - P'_{TN}/P'_{T5}$ against $$P'_{SN}/P'_{T5} \text{ where}$$

$P'_{TN}$ is the total pressure at the nozzle entrance as determined by test $P'_{T5}$ is the total pressure in the diffuser during the test, and $P'_{SN}$ is the static pressure at the nozzle entrance during the test, and means for combining said first and second signals with said constants.

3. Apparatus as defined in claim 2, in which said jet engine is operating without an afterburner in operation and in which said computer means combines said first and second signals according to the relationship $$P_{TN} = P_{T5} (1 - a_2(P_{SN}/P_{T5}) - b_2)$$

where $P_{TN}$ is the total pressure at the nozzle entrance represented by said third signal, $P_{T5}$ is the total pressure in the diffuser represented by said first signal $P_{SN}$ is the static pressure at the nozzle entrance represented by said second signal $a_2$ is a constant representing the slope of the straight line relationship $P'_{T5} - P'_{TN}/P'_{T5}$ against $P'_{SN}/P'_{T5}$ determined by test with said engine operating without an afterburner in operation, and $b_2$ is a constant representing the intercept of said straight line relationship determined by test without an afterburner in operation on the axis represented by $P'_{T5} - P'_{TN}/P'_{T5}$.

4. Apparatus as defined in claim 2, in which said jet engine is operating with an afterburner in operation and in which said computer means combines said first and second signals according to the relationship $$P_{TN} P_{T5} (1 - a_1(P_{SN}/P_{T5}) - b_1)$$

where $P_{TN}$ is the total pressure at the nozzle entrance represented by said third signal $P_{T5}$ is the total pressure in the diffuser represented by said first signal $P_{SN}$ is the static pressure at the nozzle entrance represented by said second signal $a_1$ is a constant representing the slope of the straight line relationship $P'_{T5} - P'_{TN}/P'_{T5}$ against $P'_{SN}/P'_{T5}$ determined by test with said engine operating with said afterburner in operation, and $b_1$ is a constant representing the intercept of said straight line relationship, determined by test with said afterburner in operation, on the axis represented by $P'_{T5} - P'_{TN}/P'_{T5}$.

5. Apparatus as defined in claim 4 further including apparatus for utilizing said third signal for determining the gross thrust of said engine and providing an output signal representing said gross thrust, comprising means receiving said third signal representing the total pressure at the nozzle entrance $P_{TN}$ and a fifth signal representing ambient static pressure $P_{so}$ and providing an output signal representing nozzle pressure ratio $\alpha_e = P_{TN}/P_{so}$, a first and a second decision circuit means, a first and a second logic means, said first decision circuit means being responsive to a signal indicating the nozzle is convergent-divergent to select said first logic means and responsive to a signal indicating the nozzle is convergent only to select said second decision circuit means, said second decision circuit means being responsive to said signal representing $\alpha_e$ being less than $(\gamma+1/2) \gamma/\gamma-1$, where $\gamma$ is the exhaust gas ratio of specific heats, to select said first logic means and responsive to said signal $\alpha_e$ equal or greater than $(\gamma+1/2) \gamma/\gamma-1$ to select said second logic means, said first logic means providing when selected, an output signal representing gross thrust $F_G$ in accordance with the relationship $F_G = A_N \cdot P_{so} \cdot \alpha_e \cdot f_c(\alpha_e) \cdot h(\alpha_N)$ where $A_N$ is the area of the nozzle entrance $f_c(\alpha_e)$ is a function of the nozzle pressure ratio $\alpha_e$ for a complete expansion nozzle $h(\alpha_N)$ is a function of the pressure ratio $P_{TN}/P_{SN}$ said second logic means providing, when selected, an output signal representing gross thrust $F_G$ in accordance with the relationship $F_G = A_N \cdot P_{so} \alpha_e \cdot f_i(\alpha_e) \cdot h(\alpha_N)$ where $f_i(\alpha_e)$ is a function of the nozzle pressure ratio $\alpha_e$ for an incomplete expansion nozzle.

6. A gross thrust meter for a jet type engine which includes a diffuser and a nozzle having an entrance and an exhaust, said thrust comprising means for detecting at said nozzle entrance one pressure only, said one pressure being static pressure, and providing a first signal representing this pressure, means for detecting upstream of said nozzle entrance at least one other internal engine pressure, said one other pressure being total pressure in the diffuser and providing a second signal representing this pressure, and means for detecting ambient static pressure and for providing a third signal representative thereof;

means for combining at least said first and second signal and said third signal representing ambient static pressure, and deriving an output signal therefrom representing gross thrust.

7. A gross thrustmeter as defined in claim 6, in which said means combining said signals comprises
   first and second logic means each adapted to receive said signals representing values in a predetermined relationship and to provide said output signal representing gross thrust, and
   means for detecting the existence of one of a plurality of possible engine conditions, and
   means responsive to said means for detecting for selecting one of said logic means according to engine conditions.

8. A gross thrustmeter as defined in claim 7, in which said means for selecting one of said logic means comprises
   a first and a second decision circuit each being responsive to an input signal to provide a signal at one of two outputs,
   means for producing an input signal indicative of the convergent or convergent-divergent configuration of said nozzle,
   said first decision circuit being responsive to said input signal indicative of said nozzle being convergent-divergent to provide a signal at one of said outputs selecting said first logic means, and being responsive to an input signal indicative of said nozzle being covergent only to provide a signal at the other of said outputs connected to the input of said second decision circuit,
   said second decision circuit being responsive to actuation by the signal from the other of said outputs of said first decision circuit to provide a signal at one of said outputs when said nozzle is operating in an unchoked condition selecting said first logic means, and to provide a signal at the other of said outputs when said nozzle is operating in a choked condition selecting said second logic means.

9. A gross thrustmeter for a jet type engine which includes a diffuser and a nozzle having an entrance and an exhaust, said thrustmeter comprising
   pressure responsive means for detecting total pressure $P_{T5}$ in the diffuser and providing a first analog signal representing this pressure,
   pressure responsive means for detecting only one pressure at the nozzle entrance, said one pressure being static pressure $P_{SN}$ at the nozzle entrance, and providing a second analog signal representing this pressure,
   means for detecting ambient static pressure $P_{so}$ and for producing a third analog signal representative thereof;
   means for producing a signal indicative of the convergent or divergent nature of said nozzle;
   analog to digital converter means for receiving said first and second analog signals, and said third analog signal representing ambient static pressure $P_{so}$, and for providing output data including data representing the pressures $P_{T5}$, $P_{SN}$ and $P_{so}$,
   computer means for receiving said output data and for providing an output representative of gross thrust,
   said computer means including logic for evaluating input data to provide $P_{TN}$, the total pressure at the nozzle entrance,
   said computer means including logic for evaluating $\alpha_e$ where $\alpha_e = P_{TN}/P_{so}$,
   said computer means including first and second decision logic means, and first and second output logic means, said first decision logic means responsive to said signal indicative of said nozzle being convergent-divergent for selecting said first logic output means, and responsive to a signal indicative of said nozzle being convergent only for selecting said second decision means,
   said second decision means being responsive to signals indicative of unchoked nozzle operation for selecting said first output logic means; and responsive to signals indicative of choked nozzle operation for selecting said second output logic means.

10. A gross thrust meter as defined in claim 9, in which said computer means including logic means for evaluating $P_{TN}$ comprises
    means ascertaining there is no afterburner operation for combining data representing $P_{SN}$ and $P_{T5}$ according to the relationship $P_{TN} = P_{T5} (1 - a_2(P_{SN}/P_{T5}) - b_2)$
    where
    $a_2$ is a constant representing the slope of the straight line relationship $P'_{T5} - P'_{TN}/P'_{T5}$ against $P'_{SN}/P'_{T5}$ determined by test with said engine operating without an afterburner in operation, and
    $b_2$ is a constant representing the intercept of said straight line relationship determined by test without an afterburner in operation on the axis represented by $P'_{T5} - P'_{TN}/P'_{T5}$.

11. A gross thrust meter as defined in claim 9, in which said computer means including logic for evaluating $P_{TN}$ comprises
    means ascertaining there is an afterburner in operation in the engine for combining $P_{SN}$ and $P_{T5}$ according to the relationship $$P_{TN} = P_{T5}(1 - a_1(P_{SN}/P_{T5}) - b_1)$$

where
    $a_1$ is a constant representing the slope of the straight line relationship $P'_{T5} - P'_{TN}/P'_{T5}$ against $P'_{SN}/P'_{T5}$ determined by test with said engine operating with said afterburner in operation, and $b_1$ is a constant representing the intercep of said straight line relationship, determined by test with said afterburner in operation, on the axis represented by $P'_{T5} - P'_{TN}/P'_{T5}$.

12. A method for determining the total pressure at the entrance to the nozzle of a jet engine without using an immersed probe comprising
    detecting the total pressure $P_{T5}$ in the diffuser of said engine,
    detecting the static pressure $P_{SN}$ at the nozzle entrance, and
    producing signals representing the detected pressures and combining these signals in a predetermined relationship wherein the total pressure at the nozzle entrance $P_{TN}$ is equal to the product of total pressure $P_{T5}$ and a function of the ratio of the static pressure $P_{SN}$ to the total pressure $P_{T5}$ to obtain a signal proportional to the total pressure at the nozzle entrance.

* * * * *

UNITED STATES PATENT OFFICE
CERTIFICATE OF CORRECTION

Patent No. 3,834,222                     Dated  September 10, 1974

Inventor(s) George B. McDonald

It is certified that error appears in the above-identified patent and that said Letters Patent are hereby corrected as shown below:

Page 1, before line 18, insert the following:

--SPECIFICATION

The invention herein described was developed using funds of the United States and Canadian Governments.--

Signed and sealed this 4th day of February 1975.

(SEAL)
Attest:

McCOY M. GIBSON JR.
Attesting Officer

C. MARSHALL DANN
Commissioner of Patents

UNITED STATES PATENT OFFICE
CERTIFICATE OF CORRECTION

Patent No. 3,834,222  Dated September 10, 1974

Inventor(s) George B. McDonald

It is certified that error appears in the above-identified patent and that said Letters Patent are hereby corrected as shown below:

Column 2, line 12:

Change "$h(\alpha_S)$" to --$h(\alpha_N)$--.

Column 4, line 28:

Change "entire" to -- engine--.

Column 5, line 15:

"$P_{TN} = P_{SN} \ 1 + [(F_1(P_{S6}, P_{SN})/f_2(P_{S6}, pSN) + f_6(\alpha_5)$
$[f_3(K_2) + f_5(P_{S6}, P_{SN})/f_2(P_{S6}, P_{SN})] \ [f_7(\alpha_5)-K_1]/f_4(K_2)$
$- f_5(P_{S6}, P_{SN})/f_2(P_{S6}, P_{SN})K_3$"

to --$P_{TN} = P_{SN}\{1 + [(f_1(P_{S6}, P_{SN})/f_2(P_{S6}, P_{SN}) + f_6(\alpha_5)$
$[f_3(K_2) + f_5(P_{S6}, P_{SN})/f_2(P_{S6}, P_{SN})][f_7(\alpha_5)-K_1]]/[f_4(K_2)$
$- f_5(P_{S6}, P_{SN})/f_2(P_{S6}, P_{SN})]\}^{K_3}$--.

UNITED STATES PATENT OFFICE
CERTIFICATE OF CORRECTION

Patent No. 3,834,222       Dated September 10, 1974

Inventor(s)   George B. McDonald

It is certified that error appears in the above-identified patent and that said Letters Patent are hereby corrected as shown below:

Column 5, line 45:

Change "$F_6$" to --$f_6$--.

Column 7, line 37:

Change "$(\gamma + 1/2)\beta/\gamma-1$" to -- $((\gamma + 1)/2)^{\gamma/(\gamma-1)}$ --.

Signed and Sealed this

Thirty-first Day of August 1976

[SEAL]

Attest:

RUTH C. MASON
*Attesting Officer*

C. MARSHALL DANN
*Commissioner of Patents and Trademarks*